United States Patent
Chung (10) Patent No.: US 7,605,944 B2
(45) Date of Patent: Oct. 20, 2009

(54) METHOD OF CREATING A PLURALITY OF IMAGES BY SINGLE SCANNING AND APPARATUS USING THE SAME

(75) Inventor: Jin-Tae Chung, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 947 days.

(21) Appl. No.: 11/025,151

(22) Filed: Dec. 30, 2004

(65) Prior Publication Data

US 2005/0157944 A1      Jul. 21, 2005

(30) Foreign Application Priority Data

Jan. 15, 2004      (KR)      ........................ 10-2004-0002918

(51) Int. Cl.
*G06K 15/00* (2006.01)
*H04N 1/04* (2006.01)
*G06K 9/34* (2006.01)

(52) U.S. Cl. .......................... 358/1.9; 358/2.1; 358/474; 382/173

(58) Field of Classification Search ................. 358/453, 358/443, 448, 449, 462, 464, 2.1, 1.9, 474; 382/199, 203, 266, 113, 141, 175, 176, 180, 382/190, 206, 173
See application file for complete search history.

(56) References Cited

U.S. PATENT DOCUMENTS

| | | | | |
|---|---|---|---|---|
| 4,866,486 A * | 9/1989 | Higashio et al. | ............ | 399/184 |
| 5,343,283 A | 8/1994 | van Dorsselaer et al. | .... | 358/445 |
| 5,635,725 A * | 6/1997 | Cooper | ................. | 250/559.29 |
| 5,661,635 A * | 8/1997 | Huffman et al. | ............ | 361/684 |
| 5,712,924 A | 1/1998 | Fujimoto et al. | ............ | 382/165 |
| 5,907,835 A * | 5/1999 | Yokomizo et al. | .............. | 707/1 |
| 6,012,987 A * | 1/2000 | Nation | ........................ | 473/156 |
| 6,075,968 A * | 6/2000 | Morris et al. | ............... | 434/350 |
| 6,111,667 A * | 8/2000 | Mishima et al. | ............. | 358/488 |
| 6,130,993 A * | 10/2000 | Hayakawa | .................... | 396/55 |
| 6,363,179 B1 * | 3/2002 | Evans et al. | .................. | 382/309 |
| 6,473,537 B1 * | 10/2002 | Yamada | ....................... | 382/286 |
| 7,027,353 B2 * | 4/2006 | Melese et al. | ................... | 367/7 |
| 7,215,827 B2 * | 5/2007 | Ito et al. | ...................... | 382/283 |
| 7,221,809 B2 * | 5/2007 | Geng | .......................... | 382/280 |
| 7,382,896 B2 * | 6/2008 | Ito et al. | ...................... | 382/103 |
| 2002/0057341 A1 * | 5/2002 | Tanaka | ........................ | 348/143 |

(Continued)

FOREIGN PATENT DOCUMENTS

JP      08-289132      11/1996

(Continued)

*Primary Examiner*—Jerome Grant, II
(74) *Attorney, Agent, or Firm*—Roylance, Abrams, Berdo and Goodman, LLP (57) ABSTRACT

A method and apparatus for creating a plurality of images by a single scanning, the method comprising steps for detecting edge information of at least one image scanned by a scanning process, calculating position information of each image based on the edge information, and creating independent images corresponding to the position information so that it is possible to conveniently obtain a plurality of independent images from a plurality of originals, without repeating a scanning or using an image processing program to divide a scanned picture into a plurality of independent images.

18 Claims, 5 Drawing Sheets

U.S. PATENT DOCUMENTS

| | | | |
|---|---|---|---|
| 2004/0008897 A1* | 1/2004 | Easwar ........................ | 382/250 |
| 2004/0089719 A1* | 5/2004 | Blattner et al. ............... | 235/454 |
| 2004/0229210 A1* | 11/2004 | Sabry et al. ..................... | 435/4 |
| 2004/0252587 A1* | 12/2004 | Melese et al. ................ | 367/149 |
| 2005/0069196 A1* | 3/2005 | Uchiyama et al. ........... | 382/154 |
| 2005/0093976 A1* | 5/2005 | Valleriano et al. ........... | 348/143 |
| 2005/0148854 A1* | 7/2005 | Ito et al. ..................... | 600/407 |
| 2005/0165713 A1* | 7/2005 | Lafforet ........................ | 707/1 |
| 2005/0174579 A1* | 8/2005 | Notni et al. .................. | 356/601 |

FOREIGN PATENT DOCUMENTS

| | | |
|---|---|---|
| JP | 11-184182 | 7/1999 |
| JP | 2000-184182 | 6/2000 |
| JP | 2001-078022 | 3/2001 |
| KR | P1994-12068 | 11/1992 |
| KR | P1998-069972 | 10/1998 |
| KR | 10-2000-0061891 | 10/2000 |

* cited by examiner

METHOD OF CREATING A PLURALITY OF IMAGES BY SINGLE SCANNING AND APPARATUS USING THE SAME

CROSS-REFERENCE TO RELATED APPLICATIONS

This application claims the benefit under 35 U.S.C. §119 (a) of Korean Patent Application No. 10-2004-0002918, filed in the Korean Intellectual Property Office on Jan. 15, 2004, the entire contents of which are hereby incorporated by reference.

BACKGROUND OF THE INVENTION

1. Field of the Invention

The present invention relates to a scanner for reading out images. More particularly, the present invention relates to a method of creating a plurality of independent image files for a plurality of scanned images by a single scanning, and an apparatus using the same.

2. Description of the Related Art

A conventional scanner comprises a scan mode selecting unit, a scan driver for reading out an original image, an image display unit for displaying the scanned image, an image selecting unit for selecting one of the regions in the displayed image, and an image processing unit for editing the scanned image.

Typically, two kinds of methods have been used for scanning a plurality of originals so as to obtain each image file corresponding to each original.

As a first method, a plurality of image files are obtained by using an image processing unit. Specifically, if a user adjusts positions of the originals to be scanned on a scanner and selects a desired resolution or mode by using the scan mode selecting unit, the scan driver reads out images corresponding to the originals in response to the selected scan command. The display unit then displays the read images. A user selects desired regions in the displayed images and instructs the scanner to copy or cut out the selected regions by using the image processing unit to produce new files. The scanned images corresponding to the originals can be obtained by repeating the procedures of selecting desired regions in the images as required, and creating new files corresponding to the selected regions.

Figure 1A:
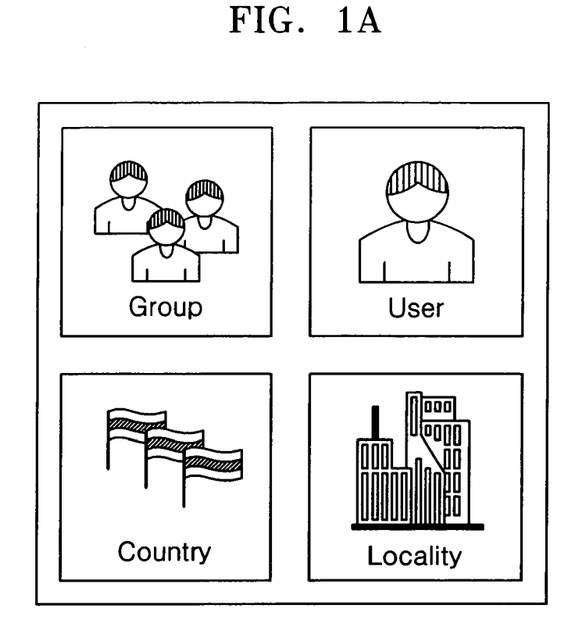
FIGS. 1A and 1B show diagrams for illustrating a plurality of scanned images and a state wherein the scanned images are separately displayed in a single page.
Figure 1B:
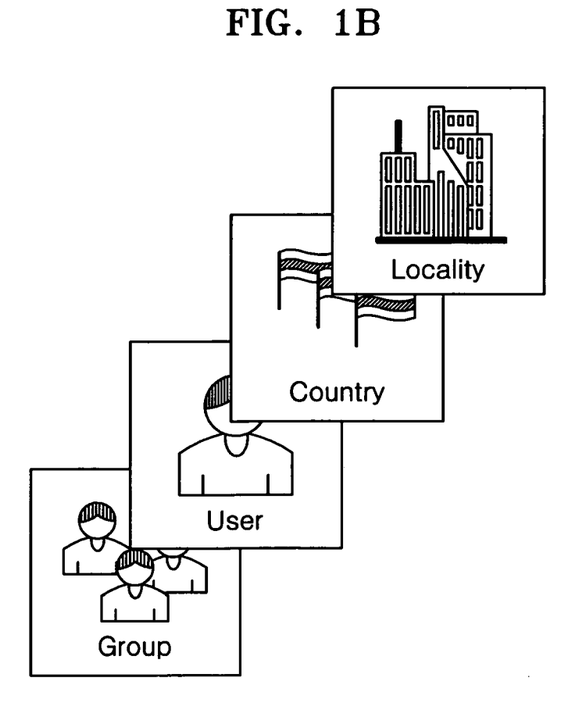

FIG. 1 shows a plurality of scanned images and a state wherein the scanned images are separately displayed in a single page. That is, FIG. 1A shows a state wherein four scanned images are displayed in a single page, and FIG. 1B shows a state wherein each scanned image is converted into new files by the image processing unit and then displayed in separate windows.

As a second method, a plurality of image files are obtained by repeating the procedures of scanning one original at a time and then individually storing it.

If there is no application program corresponding to the image processing unit, or if a user is not familiar with the image processing unit, it is impossible to create independent image files corresponding to a plurality of originals by using the image processing unit, and thus, a user must repeat the scanning over a number of times. Therefore, the scanning is performed as many number of times as corresponding to the number of originals in order to scan a plurality of originals and store them as independent images. This consumes a significant amount of time and increases the user's inconvenience due to tedious and repetitive tasks.

Accordingly, a need exists for a system and method to conveniently obtain a plurality of independent images from a plurality of originals, without repeating a scanning or using an image processing program to divide a scanned picture.

SUMMARY OF THE INVENTION

The present invention provides a method of creating separate individual image files from a plurality of originals by a single scanning.

The present invention also provides an apparatus for creating separate individual image files from a plurality of originals by a single scanning.

According to an aspect of the present invention, a method of creating a plurality of images by a single scanning is provided, the method comprising the steps of detecting edge information of at least one image scanned by a scanning process, calculating position information of each image based on the edge information, and creating independent images corresponding to the position information.

According to another aspect of the present invention, an apparatus for creating a plurality of images by a single scanning is provided, the apparatus comprising an edge information detecting unit for detecting edge information of at least one image scanned by a scanning process, a position information calculating unit for calculating each position information of each image based on the edge information, and an independent image creating unit for creating independent images corresponding to the position information.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numerals will be understood to refer to like parts, components and structures.

DETAILED DESCRIPTION OF EXEMPLARY EMBODIMENTS

The present invention will now be described more fully with reference to the accompanying drawings, in which, exemplary embodiments of the present invention are shown. The present invention may, however, be embodied in many different forms and should not be construed as being limited to the embodiments set forth herein; rather, these exemplary embodiments are provided so that the disclosure will be thorough and complete, and will fully convey the concept of the present invention to those skilled in the art. Like reference numerals in the drawings denote like elements, and thus their descriptions will be provided only once.

Figure 2:
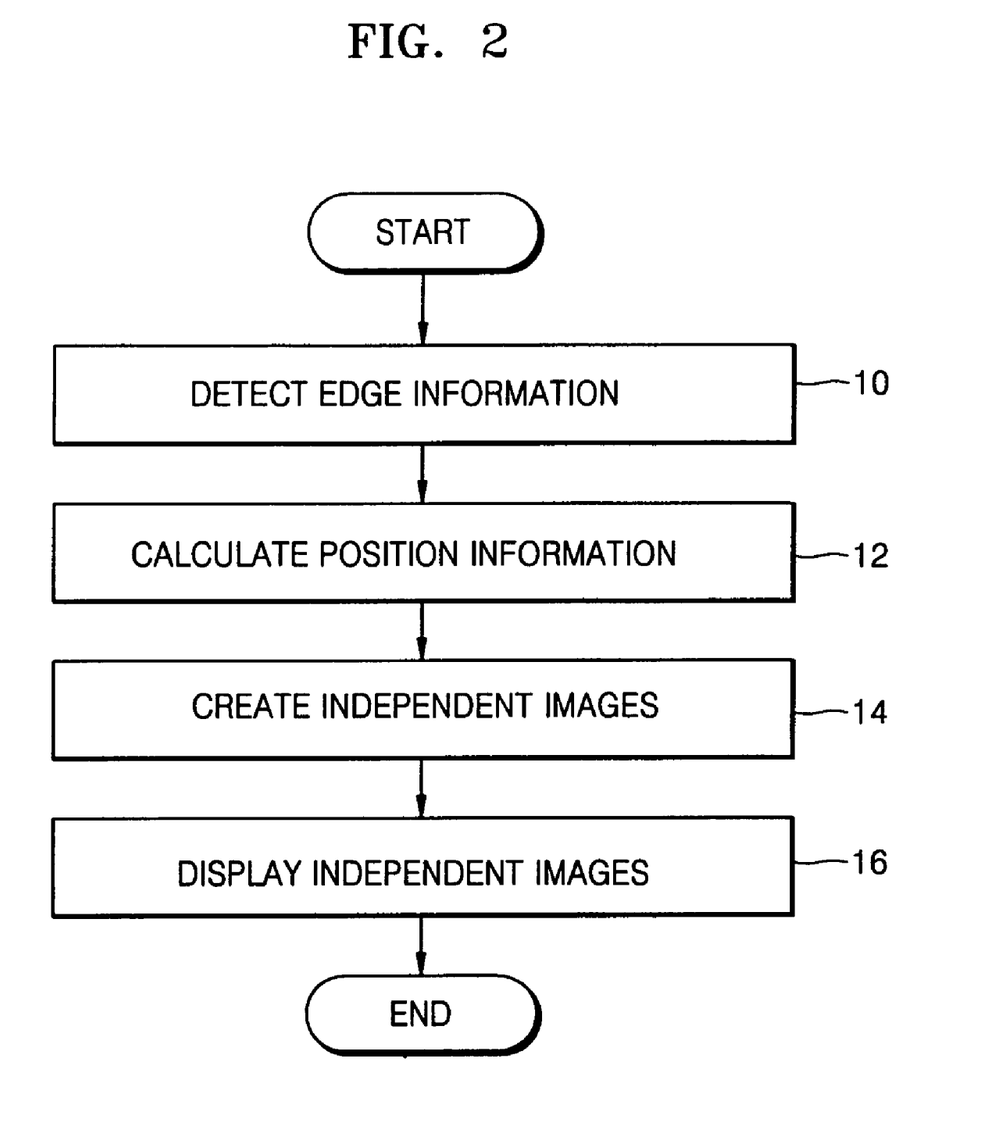
FIG. 2 shows a flow chart for describing a method of creating a plurality of image files by a single scanning according to an embodiment of the present invention.

FIG. 2 shows a flow chart for describing a method of creating a plurality of image files by a single scanning according to an embodiment of the present invention. A method of creating a plurality of image files by a single scanning according to an embodiment of the present invention comprises the operations of steps (10) through (16) of calculating position information of a plurality of originals, creating independent image files based on the position information, and then displaying the created independent images.

In a first step of the method of FIG. 2, edges of at least one image scanned by a scanning process are detected as edge information at step (10). The at least one image scanned by the scanning process can be obtained by scanning a plurality of images placed on a flat bed of a scanning apparatus or by scanning a plurality of images in a single page.

Figure 3:
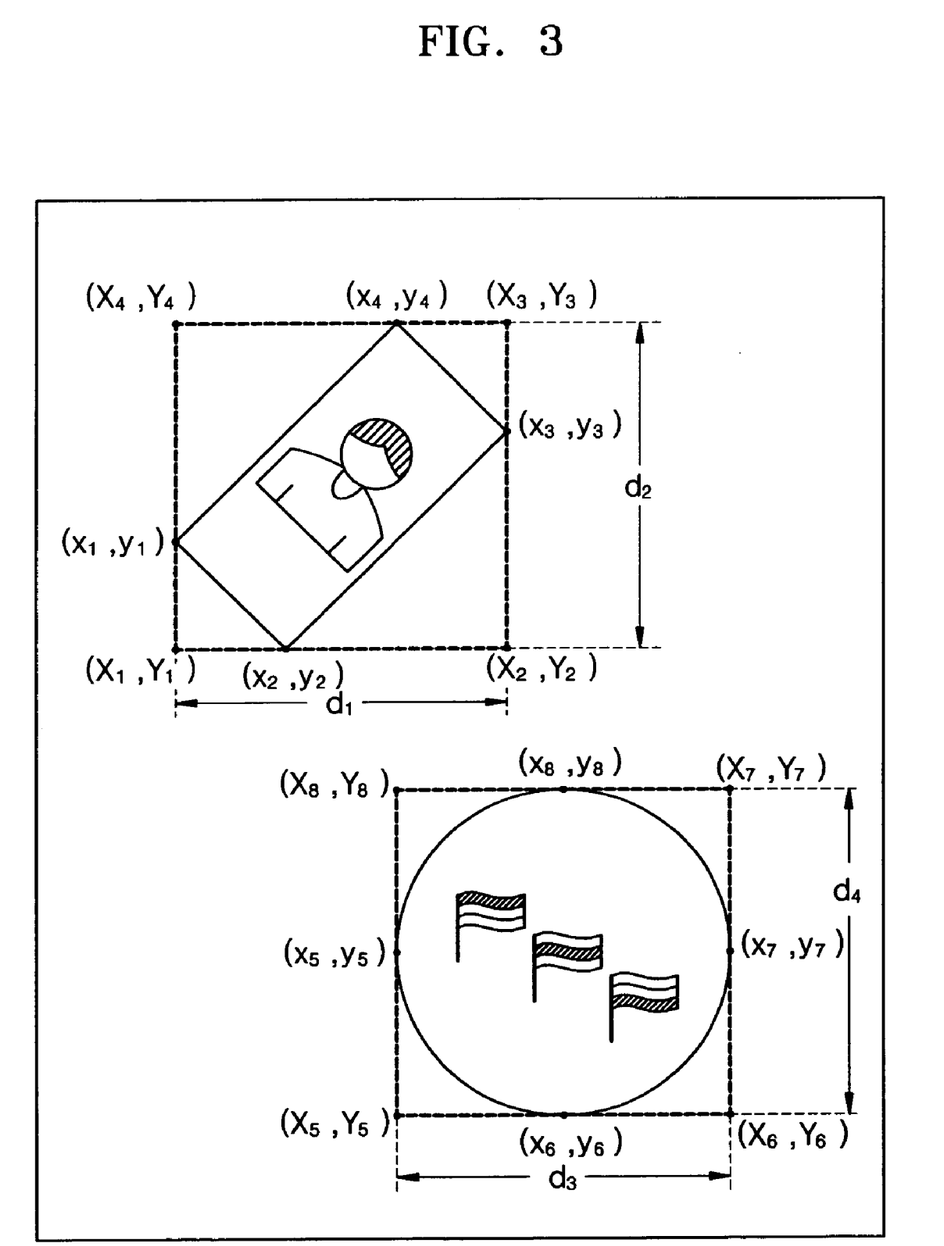
FIG. 3 shows a diagram for illustrating two images scanned in a single page and their position information according to an embodiment of the present invention.

FIG. 3 shows a diagram for illustrating two images scanned in a single page and their position information. A state is shown wherein both a rectangular image corresponding to a rectangular original, and a circular image corresponding to a circular original, are scanned in a single picture. Edge information of each of the rectangular and circular images is detected from the scanned rectangular and circular images.

The edge information of the rectangular and circular images can be represented by coordinate values. The edge information of the rectangular image includes coordinate values of the edge regions of the rectangular original. Therefore, the edge information of the rectangular image includes a coordinate value (x1, y1), having x1 as the smallest value on a horizontal axis, a coordinate value (x3, y3), having x3 as the largest value on a horizontal axis, a coordinate value (x2, y2), having y2 as the smallest value on a vertical axis, and a coordinate value (x4, y4), having y4 as the largest value on a vertical axis.

In addition, the edge information of the circular image includes coordinate values of the edge portions of the circular original. Therefore, the edge information of the circular image includes a coordinate value (x5, y5), having x5 as the smallest value on a horizontal axis, a coordinate value (x7, y7), having x7 as the largest value on a horizontal axis, a coordinate value (x6, y6), having y6 as the smallest value on a vertical axis, and a coordinate value (x8, y8), having y8 as the largest value on a vertical axis.

After the operation of step (10) in FIG. 2, position information is calculated for each image based on the detected edge information at step (12). The present invention is characterized in that the position information includes the largest horizontal value, the smallest horizontal value, the largest vertical value, and the smallest vertical value from among the coordinate values for the edge information of the scanned images. For example, as shown in FIG. 3, it is possible to obtain the smallest horizontal value x1, the largest horizontal value x3, the smallest vertical value y2, and the largest vertical value y4, from the edge information of the rectangular image, that is, the coordinate values of four points comprising (x1, y1), (x3, y3), (x2, y2), and (x4, y4), and then use the obtained result as the position information of the rectangular image.

According to an embodiment of the present invention, the position information includes specific coordinate values of four points defined as (the smallest horizontal value, the smallest vertical value), (the largest horizontal value, the smallest vertical value), (the largest horizontal value, the largest vertical value), and (the smallest horizontal value, the largest vertical value).

For example, as shown in FIG. 3, the position information of the rectangular image includes specific coordinate values of four points comprising (X1, Y1), (X2, Y2), (X3, Y3), and (X4, Y4), corresponding to the four points defined as (the smallest horizontal value, the smallest vertical value), (the largest horizontal value, the smallest vertical value), (the largest horizontal value, the largest vertical value), and (the smallest horizontal value, the largest vertical value), respectively. In this example, the coordinate values X1 and X4, are equal to the smallest horizontal value x1. Similarly, the coordinate values X2 and X3, are equal to the largest horizontal value x3, the coordinate values Y1 and Y2, are equal to the smallest vertical value y2, and the coordinate values Y3 and Y4, are equal to the largest vertical value y4.

In addition, the position information of the circular image includes specific coordinate values of four points comprising (X5, Y5), (X6, Y6), (X7, Y7), and (X8, Y8), corresponding to the four points defined as (the smallest horizontal value, the smallest vertical value), (the largest horizontal value, the smallest vertical value), (the largest horizontal value, the largest vertical value), and (the smallest horizontal value, the largest vertical value), respectively. In this example, the coordinate values X5 and X8, are equal to the smallest horizontal value x5. Similarly, the coordinate values X6 and X7, are equal to the largest horizontal value x7, the coordinate values Y5 and Y6, are equal to the smallest vertical value y6, and the coordinate values Y7 and Y8, are equal to the largest vertical value y8.

According to another embodiment of the present invention, the position information is obtained by selecting one of four points defined as (the smallest horizontal value, the smallest vertical value), (the largest horizontal value, the smallest vertical value), (the largest horizontal value, the largest vertical value), and (the smallest horizontal value, the largest vertical value), as a reference point, and then calculating information regarding vertical and horizontal lengths corresponding to the position information of the independent image based on the reference point.

For example, as shown in FIG. 3, according to another embodiment of the present invention, the position information of the rectangular image is obtained by selecting one of four points (X1, Y1), (X2, Y2), (X3, Y3), and (X4, Y4), corresponding to the four points defined as (the smallest horizontal value, the smallest vertical value), (the largest horizontal value, the smallest vertical value), (the largest horizontal value, the largest vertical value), and (the smallest horizontal value, the largest vertical value), respectively, as a reference point. If, in this example, the coordinate value (X1, Y1) is selected as the reference point according to an embodiment of the present invention, a horizontal length d1 corresponding to the difference between the largest horizontal value x3 and the smallest horizontal value x1, and a vertical length d2 corresponding to the difference between the largest vertical value y4 and the smallest vertical value y2, can each be calculated.

In addition, according to another embodiment of the present invention, the position information of the circular image is obtained by selecting one of the four points (X5, Y5), (X6, Y6), (X7, Y7), and (X8, Y8), corresponding to the four points defined as (the smallest horizontal value, the smallest vertical value), (the largest horizontal value, the smallest vertical value), (the largest horizontal value, the largest vertical value), and (the smallest horizontal value, the largest vertical value), respectively, as a reference point. If, in this example, the point (X5, Y5) is selected as the reference point, a horizontal length d3 corresponding to the difference between the largest horizontal value x7 and the smallest horizontal value x5, and a vertical length d4 corresponding to the difference between the largest vertical value y8 and the smallest vertical value y6, can each be calculated.

Returning to FIG. 2, after the operation of step (12), each independent image corresponding to position information is created at step (14). The independent image is created by cutting one of the images scanned in a single page into a separate new file.

Figure 4:
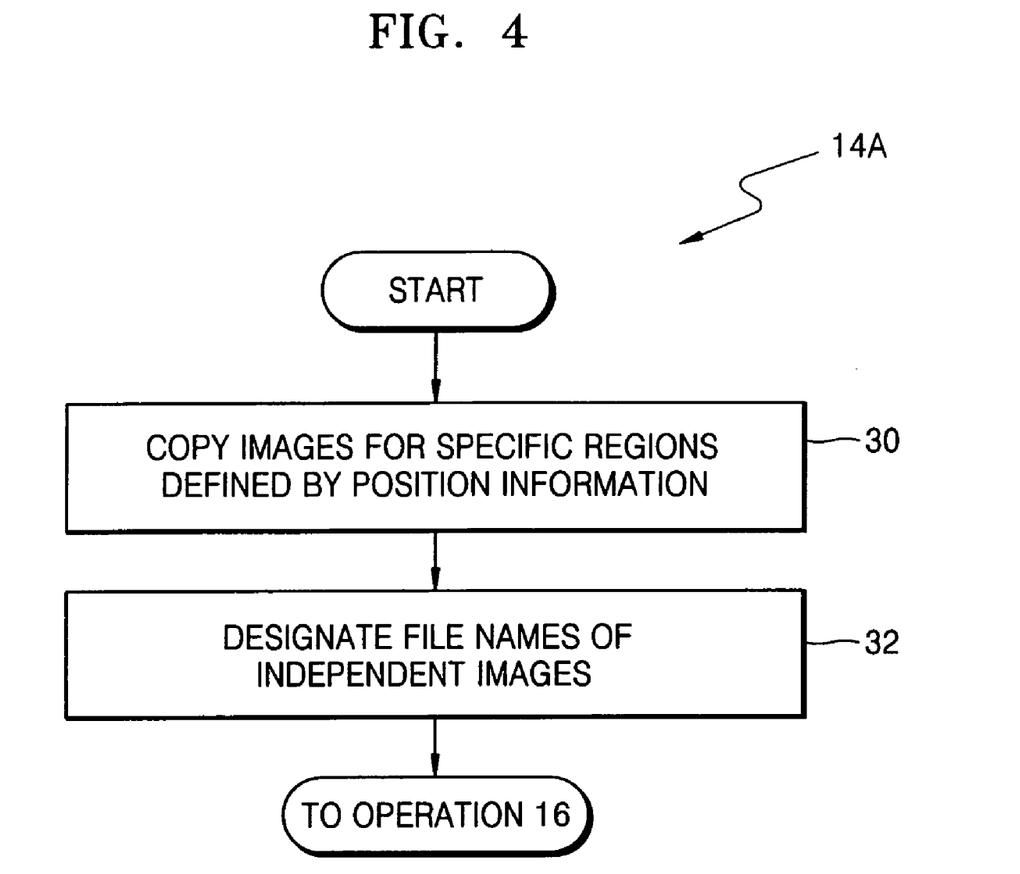
FIG. 4 shows a flow chart for describing the operation of step (14) shown in FIG. 2 according to an embodiment of the present invention.

FIG. 4 shows a flow chart for describing the operation of step (14) shown in FIG. 2 according to an embodiment of the present invention. The operation of flowchart 14A comprises the operations of steps (30) and (32) of copying images for predetermined regions defined by the position information and then designating file names of the copied images.

First, scanned images for predetermined regions, defined by the position information, are copied to create independent images at step (30).

For example, as shown in FIG. 3, if, in this example, the position information of the rectangular image includes specific coordinate values of four points (X1, Y1), (X2, Y2), (X3, Y3), and (X4, Y4), according to an embodiment of the present invention, an internal region shown as a dotted bold line created by connecting the four points can be copied as the independent image corresponding to the position information of the rectangular image. Also, if, in this example, the position information of the rectangular image is obtained by selecting the point (X1, Y1) as the reference point, and the horizontal length d1 and the vertical length d2 are calculated according to another embodiment of the present invention, an internal region shown as a dotted bold line created by extending the horizontal length d1 and the vertical length d2 from the reference point (X1, Y1), can be copied as the independent image. The copied independent image corresponding to the rectangular original forms a separate image file that is different from the circular original which is scanned together in a single page.

As shown in FIG. 3, if, in this example, the position information of the circular image includes specific coordinate values of four points (X5, Y5), (X6, Y6), (X7, Y7), and (X8, Y8) according to an embodiment of the present invention, an internal region shown as a dotted bold line created by connecting the four points can be copied as the independent image corresponding to the position information of the circular original. In addition, if, in this example, the position information of the circular image is obtained by selecting (X5, Y5) as a reference point, and the horizontal length d3 and the vertical length d4 are calculated according to another embodiment of the present invention, an internal region shown as a dotted bold line created by extending the horizontal length d3 and the vertical length d4 from the reference point (X5, Y5) can be copied as an independent image.

Returning to FIG. 4, after the operation of step (30), file names are designated for the created independent images at step (32). For example, as shown in FIG. 3, file names are designated for the independent images corresponding to the rectangular and circular originals, respectively. Therefore, it is possible to create two independent image files for the rectangular and circular images scanned in a single page without repeating a scanning.

Returning to FIG. 2, after the operation of step (14), the created independent images are displayed at step (16). For example, as shown in FIG. 3, the independent images corresponding to the rectangular and circular originals are displayed, respectively.

Accordingly, users are allowed to examine the displayed independent images and can instruct the storage of only the necessary images.

An apparatus for creating a plurality of images by a single scanning according to an embodiment of the present invention will now be described in greater detail with reference to the accompanying drawings.

Figure 5:
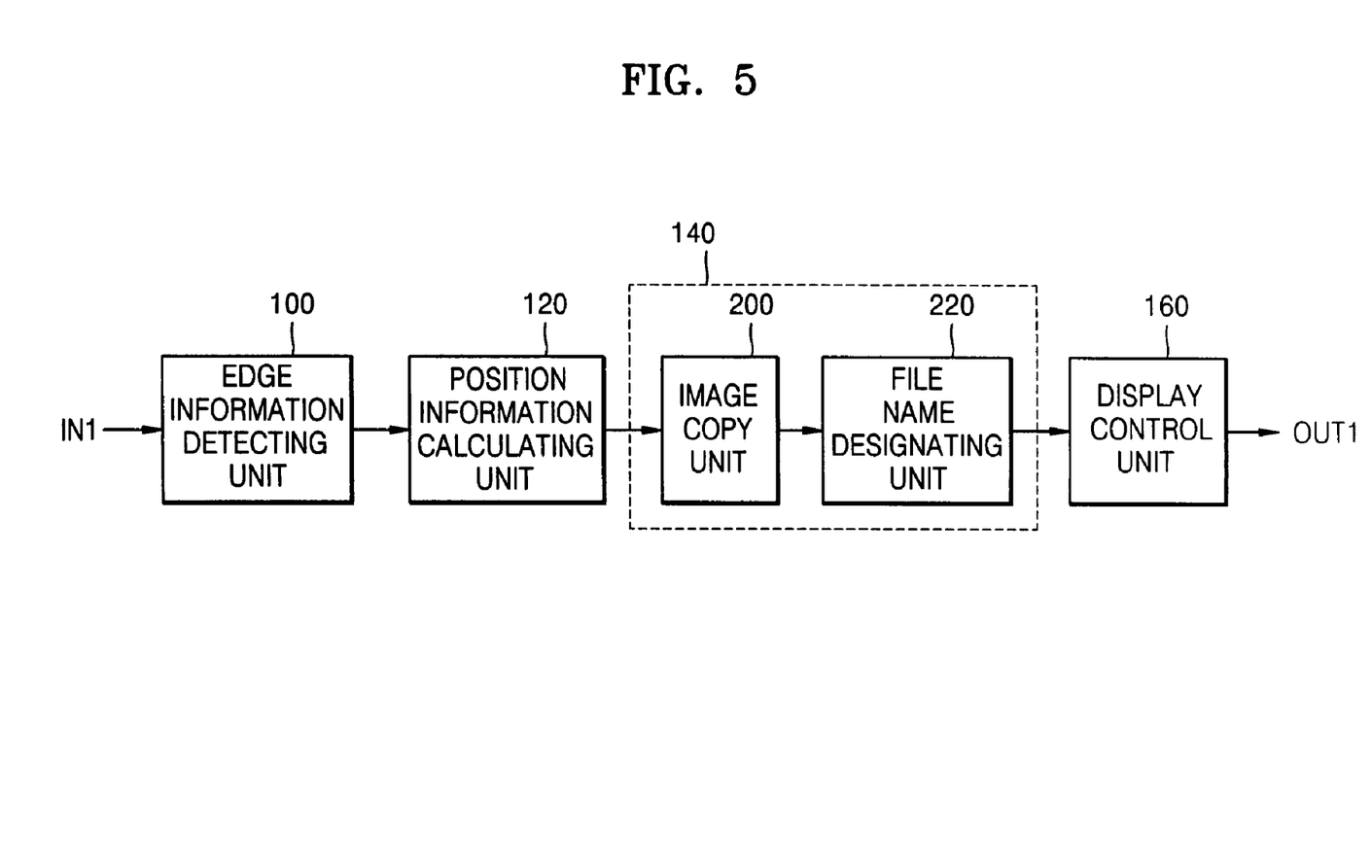
FIG. 5 shows a block diagram for describing an apparatus for creating a plurality of image files by a single scanning according to an embodiment of the present invention.

FIG. 5 shows a block diagram for describing an apparatus for creating a plurality of image files by a single scanning according to an embodiment of the present invention. The apparatus for creating a plurality of images by a single scanning comprises an edge information detecting unit 100, a position information calculating unit 120, an independent image creating unit 140, and a display control unit 160.

The edge information detecting unit 100 detects edge information of at least one image scanned by a scanning process. The edge information detecting unit 100 receives data on the images scanned in a single page through an input terminal IN1. The at least one image scanned by the scanning process may be obtained by scanning a plurality of images placed on a flat bed of a scanning apparatus or by scanning a plurality of images in a single page. The edge information detecting unit 100 detects information on the edges of each received image, and outputs the result of the detection to the position information calculating unit 120.

The position information calculating unit 120 calculates position information of each scanned image based on the edge information input from the edge information detecting unit 100, and outputs the result of the calculation to the independent image creating unit 140.

Preferably, the position information calculating unit 120 detects a smallest horizontal value, a largest horizontal value, a smallest vertical value, and a largest vertical value, as the position information based on the edge information of each image. According to an embodiment of the present invention, the position information calculating unit 120 detects specific coordinate values of four points defined as (the smallest horizontal value, the smallest vertical value), (the largest horizontal value, the smallest vertical value), (the largest horizontal value, the largest vertical value), and (the smallest horizontal value, the largest vertical value), as the position information. According to another embodiment of the present invention, the position information calculating unit 120 selects one of the four points defined as (the smallest horizontal value, the smallest vertical value), (the largest horizontal value, the smallest vertical value), (the largest horizontal value, the largest vertical value), and (the smallest horizontal value, the largest vertical value), as a reference point, and then calculates horizontal and vertical lengths corresponding to the position information of an independent image by using the reference point.

The independent image creating unit 140 creates each independent image corresponding to position information of each in response to first through Nth position information input from the position information calculating unit 120, and outputs the result to the display control unit 160.

The independent image creating unit 140 comprises an image copy unit 200 and a file name designation unit 220.

The image copy unit 200 copies independent images for predetermined regions defined by the position information, and outputs the result to the file name designation unit 220 as independent image files.

The file name designation unit 220 designates file names of the independent image files input from the image copy unit 200, and outputs the result to the display control unit 160. The independent images of which file names have been designated, are then stored in predetermined storage space (not shown).

The display control unit 160 instructs the display of the independent images created by the independent image creating unit 140, and outputs a display instruction signal through an output terminal OUT1 as a result. The independent images are then displayed in response to the display instruction signal output through the output terminal OUT1.

As described above, according to the present invention, it is possible to create independent images from a plurality of originals by a single scanning, without a separate image processing program, when a user tries to scan a plurality of originals. Accordingly, it is possible to conveniently obtain independent images from a plurality of originals, without requiring a user to repeat a scanning or use an image processing program to divide a scanned picture into a plurality of independent images.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of creating a plurality of images by a single scanning, the method comprising:
   detecting edge information using scanned data of at least one image scanned by a scanning process;
   calculating position information of each image based on the edge information; and
   creating independent images corresponding to the position information.

2. The method according to claim 1, further comprising the step of displaying the independent images.

3. The method according to claim 1, wherein the step of calculating position information further comprises the step of:
   calculating the position information of each image to include specific coordinate values of four points defined as (a smallest horizontal value of the edge information, a smallest vertical value of the edge information), (a largest horizontal value of the edge information, the smallest vertical value), (the largest horizontal value, a largest vertical value of the edge information), and (the smallest horizontal value, the largest vertical value).

4. The method according to claim 1, wherein the step of calculating position information further comprise the steps of:
   calculating the position information of each image by selecting one of four points defined as (a smallest horizontal value of the edge information, a smallest vertical value of the edge information), (a largest horizontal value of the edge information, the smallest vertical value), (the largest horizontal value, a largest vertical value of the edge information), and (the smallest horizontal value, the largest vertical value) as a reference point; and
   calculating a horizontal and vertical length for each independent image corresponding to the position information of each image by using the reference point.

5. The method according to claim 1, wherein the step of creating independent images comprises the steps of:
   copying images for specific regions defined by the position information to create independent images; and
   designating file names of the independent images.

6. An apparatus for creating a plurality of images by a single scanning, the apparatus comprising:
   an edge information detecting unit for detecting edge information using scanned data of at least one image scanned by a scanning process;
   a position information calculating unit for calculating position information of each image based on the edge information; and
   an independent image creating unit for creating independent images corresponding to the position information.

7. The apparatus according to claim 6, further comprising a display control unit for instructing a display of the independent images.

8. The apparatus according to claim 6, wherein the position information calculating unit calculates each position information to include specific coordinate values of four points defined as (a smallest horizontal value of the edge information, a smallest vertical value of the edge information), (a largest horizontal value of the edge information, the smallest vertical value), (the largest horizontal value, a largest vertical value of the edge information), and (the smallest horizontal value, the largest vertical value).

9. The apparatus according to claim 6, wherein the position information calculating unit calculates each position information by selecting one of four points defined as (a smallest horizontal value of the edge information, a smallest vertical value of the edge information), (a largest horizontal value of the edge information, the smallest vertical value), (the largest horizontal value, a largest vertical value of the edge information), and (the smallest horizontal value, the largest vertical value) as a reference point, and further calculates a horizontal and vertical length for each independent image corresponding to the position information of each by using the reference point.

10. The apparatus according to claim 6, wherein the independent image creating unit comprises:
    an image copy unit for copying images for specific regions defined by the position information to create independent images; and
    a file name designating unit for designating file names of the independent images.

11. A method of creating a plurality of images by a single scanning, the method comprising:
    detecting edge information of at least one image scanned by a scanning process;
    calculating position information of each image based on the edge information; and
    creating independent images corresponding to the position information by copying images for specific regions defined by the position information to create independent images and designating file names of the independent images.

12. The method according to claim 11, further comprising the step of displaying the independent images.

13. The method according to claim 11, wherein the step of calculating position information further comprises the step of:
    calculating the position information of each image to include specific coordinate values of four points defined as (a smallest horizontal value of the edge information, a smallest vertical value of the edge information), (a largest horizontal value of the edge information, the smallest vertical value), (the largest horizontal value, a largest vertical value of the edge information), and (the smallest horizontal value, the largest vertical value).

14. The method according to claim 11, wherein the step of calculating position information further comprise the steps of:

calculating the position information of each image by selecting one of four points defined as (a smallest horizontal value of the edge information, a smallest vertical value of the edge information), (a largest horizontal value of the edge information, the smallest vertical value), (the largest horizontal value, a largest vertical value of the edge information), and (the smallest horizontal value, the largest vertical value) as a reference point; and calculating a horizontal and vertical length for each independent image corresponding to the position information of each image by using the reference point.

15. An apparatus for creating a plurality of images by a single scanning, the apparatus comprising:

an edge information detecting unit for detecting edge information of at least one image scanned by a scanning process;

a position information calculating unit for calculating position information of each image based on the edge information; and an independent image creating unit for creating independent images corresponding to the position information, wherein the independent image creating unit comprises an image copy unit for copying images for specific regions defined by the position information to create independent images and a file name designating unit for designating file names of the independent images.

16. The apparatus according to claim 15, further comprising a display control unit for instructing a display of the independent images.

17. The apparatus according to claim 15, wherein the position information calculating unit calculates each position information to include specific coordinate values of four points defined as (a smallest horizontal value of the edge information, a smallest vertical value of the edge information), (a largest horizontal value of the edge information, the smallest vertical value), (the largest horizontal value, a largest vertical value of the edge information), and (the smallest horizontal value, the largest vertical value).

18. The apparatus according to claim 15, wherein the position information calculating unit calculates each position information by selecting one of four points defined as (a smallest horizontal value of the edge information, a smallest vertical value of the edge information), (a largest horizontal value of the edge information, the smallest vertical value), (the largest horizontal value, a largest vertical value of the edge information), and (the smallest horizontal value, the largest vertical value) as a reference point, and further calculates a horizontal and vertical length for each independent image corresponding to the position information of each by using the reference point.

* * * * *

UNITED STATES PATENT AND TRADEMARK OFFICE
CERTIFICATE OF CORRECTION

PATENT NO.       : 7,605,944 B2                          Page 1 of 1
APPLICATION NO.  : 11/025151
DATED            : October 20, 2009
INVENTOR(S)      : Jin-Tae Chung It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1330 days.

Signed and Sealed this

Fifth Day of October, 2010

David J. Kappos
*Director of the United States Patent and Trademark Office*